United States Patent [19]
Adlam

[11] 4,185,185
[45] Jan. 22, 1980

[54] LASER WELDING
[75] Inventor: Joseph D. Adlam, Carmel, Ind.
[73] Assignee: Union Carbide Corporation, New York, N.Y.
[21] Appl. No.: 788,451
[22] Filed: Apr. 20, 1977

Related U.S. Application Data
[63] Continuation-in-part of Ser. No. 625,479, Oct. 24, 1975, abandoned.

[51] Int. Cl.² .................................................. B23K 9/00
[52] U.S. Cl. ............................................ 219/121 LM
[58] Field of Search ..... 219/121 L, 121 LM, 121 EM

[56] References Cited
U.S. PATENT DOCUMENTS
| | | | |
|---|---|---|---|
| 3,417,223 | 12/1968 | Steigerwald | 219/121 EM |
| 3,539,761 | 11/1970 | Rudd | 219/121 EM |
| 3,974,016 | 8/1976 | Bondybey | 219/121 L |

OTHER PUBLICATIONS
John F. Ready "Laser Applications in Metal Working", *The Tool and Manufacturing* pp. 24–28 Mar./69.
O. A. Velichko et al., "The Laser Beam Welding of Butt Joints Between Dissimilar Metals", Avt. Svarka, 1972, #3, pp. 71–73.

*Primary Examiner*—J. V. Truhe
*Assistant Examiner*—Fred E. Bell
*Attorney, Agent, or Firm*—Eugene Lieberstein

[57] ABSTRACT

A continuous seam weldment is established between two strips of sheet material while the strips are moving by forming a converging Vee geometry between the moving strips, applying a pressure at the point of convergence and focusing a laser beam into the converging Vee.

18 Claims, 11 Drawing Figures

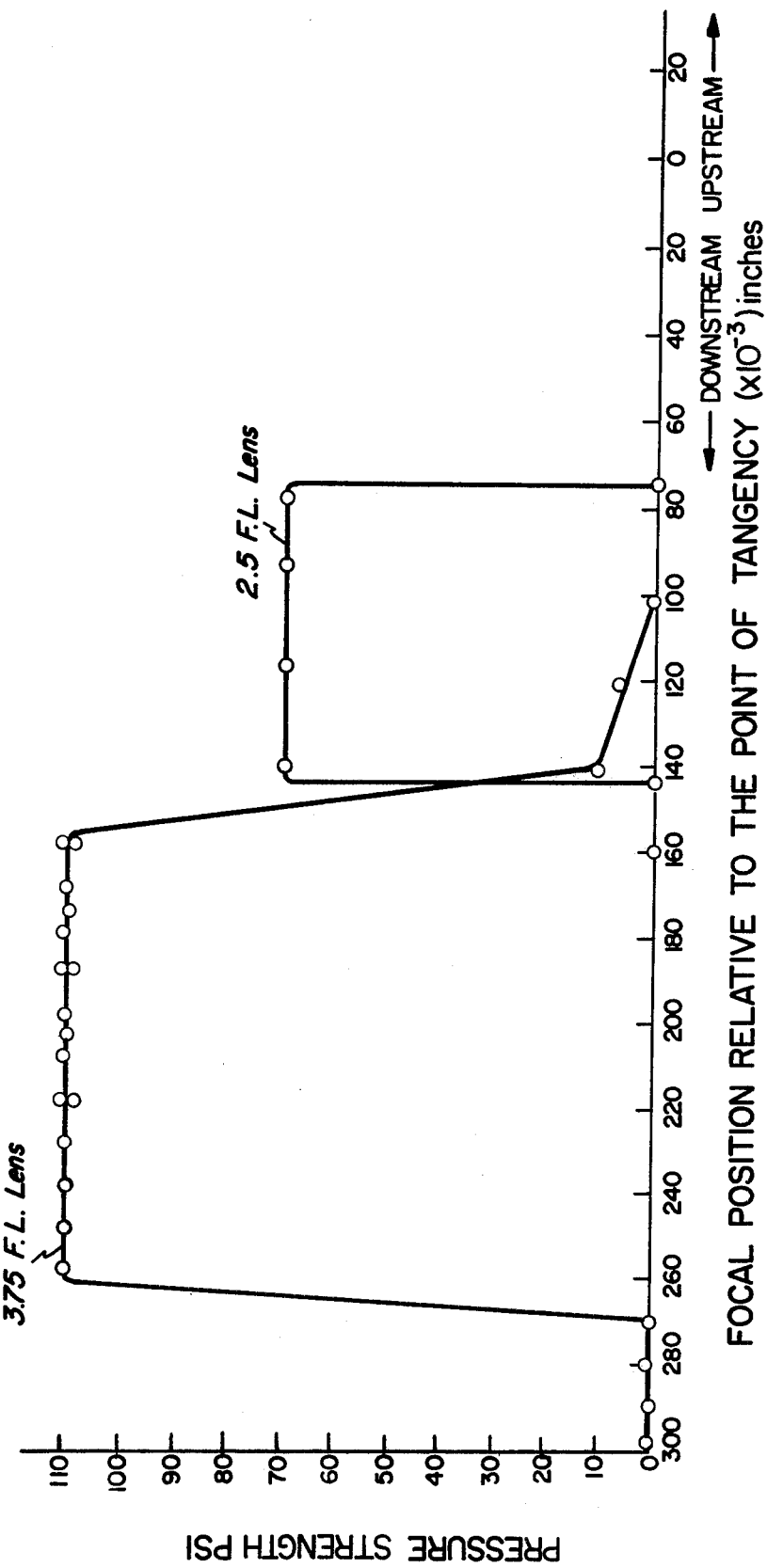

UPSTREAM ←——— ———→ DOWNSTREAM

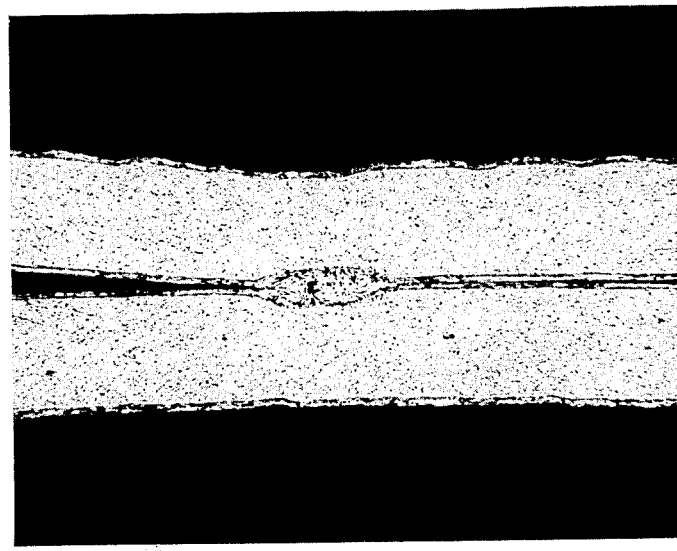
F I G. 5b
F I G. 5a
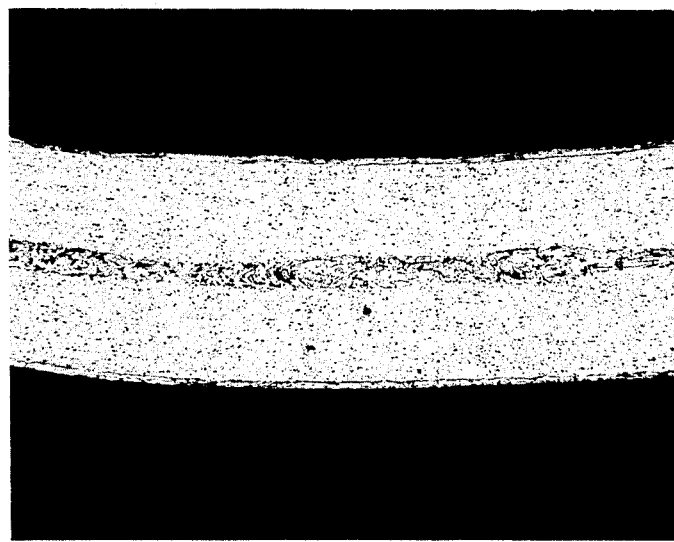

LASER WELDING

This application is a Continuation-In-Part of my earlier filed copending application Ser. No. 625,479, filed Oct. 24, 1975, now abandoned.

The present invention relates to a process for continuous seam welding of strips of sheet material at high speed utilizing a laser beam as the welding source of energy and to the weldment produced by such process.

In order to seam weld sheet material at high rates of linear speed, two conditions must be fulfilled. The weld energy must be delivered to the workpieces at high density so that the heating is local, and the weldment must be formed quickly before the heat diffuses away into the bulk of the metal. Heretofore, the composition of the material was particularly significant in controlling the welding rate, especially where the material was a conductive metal such as aluminum. In conventional gas and electric welding processes, the welding speed is limited to less than about 40 feet per minute even for light gage metal material because the heating is not sufficiently local, with a substantial amount of the heat being lost to the metal bulk and the surroundings. High frequency resistance welding is able to accomplish high speed, in some cases 300 to 400 feet per minute, but only in a limited number of configurations where the contact area is narrow and the weld energy is concentrated in the contact area. An electron beam provides a high energy density source but requires a vacuum working environment to provide a high density beam over a reasonable distance. Hence, all known welding processes to date are either intrinsically incapable of welding workpieces at reasonably high travel speeds of at least 100 fpm, particularly for workpieces of sheet aluminum, or are otherwise handicapped by specific configuration limitations and impractical fixturing requirements.

It has been discovered in accordance with the present invention that a continuous welded seam can be established between moving workpieces of sheet material by utilizing a laser beam as the welding source of energy provided certain critical requirements are met. Laser beams have heretofore been successively employed as high power, high energy density sources of energy to provide deep penetrating welds and for spot welding. In all previous applications to which lasers have been applied in the welding field, the direction has been to higher power for deeper penetration. The process of the present invention is not limited to a specific minimum power density. In fact, penetration through the cross-section of the workpieces is undesirable to the process of this invention and for certain applications detrimental. Stated otherwise, the process of the present invention will produce a welded seam between the strips of sheet material which is not visible except at the ends of the seam. Any laser source may be used although there will be a trade-off in welding speed at reduced laser power. Using only a one 1 kw $CO_2$ continuous wave laser, welding speeds of up to 500 feet per minute have been achieved with excellent weld quality.

It has also been discovered that the weldment produced by the process of the present invention is a "Fusion Weld", hereinafter defined as coalescence between the base materials resulting from bringing them to a molten state in the fusion zone; and which weldment is further characterized by the absence of a "Heat Affected Zone (HAZ)" in the surrounding base material. HAZ is a conventional term which is defined as that portion of the base metal adjacent to the fusion zone which has not been melted but whose mechanical properties or microstructure have been altered by the heat from the formation of the weld. The absence of a Heat Affected Zone (HAZ) surrounding the fusion zone is defined for purposes of the present invention as the inability to detect microstructural alterations under a conventional optical microscope at up to 100× magnification. Under such circumstances the extent of any microstructural alterations would be less than 0.0004 inches. All known welding processes to date produce a weldment with a clearly discernible Heat Affected Zone (HAZ) visible in most cases to the naked eye alone. Known conventional laser and electron beam welds result in weldments with a significant HAZ apparent in photomicrographs taken with an optical microscope at 50× magnification.

The method of continuous seam welding of moving strips of sheet material according to the present invention comprises:
  directing at least one of the moving strips toward the other to form a converging Vee between the moving strips;
  applying a force of more than zero pounds at a location contiguous to the point at which said moving strips converge such that the moving strips overlay one another in intimate contact at the point of convergence; and
  directing a laser beam of energy into said converging Vee such that a continuous welded seam is established between the moving overlaid strips.

In addition, a continuous seal weldment is formed comprising a fusion weld nugget established between two base materials characterized by the absence of a surrounding Heat Affected Zone (HAZ).

It has also been discovered in accordance with the present invention that when optimum utilization of the laser beam source is required the laser beam must be focused substantially within the plane of symmetry and within a narrow focal point range extending only in the downstream direction from essentially at the point of convergence to a point further downstream thereof. For purposes of the present disclosure "optimum utilization of the laser beam source" means the ability to achieve a continuous weldment at the highest possible speed using the least amount of laser beam energy. The ability to minimize laser power and still weld at high speed should not be underestimated for it provides a substantial economic advantage over a system which must otherwise depend upon significantly higher laser power to achieve a continuous weldment at high speed.

Accordingly, it is the principal object of the present invention to provide a process for welding moving sheets of strip material at high speed using a laser beam to establish a welded seam between the moving strips.

It is a further object of the present invention to provide a weldment comprising a fusion weld nugget characterized by the absence of a Heat Affected Zone (HAZ).

Further objects and advantages of the present invention will become apparent from the following detailed description when taken in connection with the accompanying drawings in which:

FIG. 2 is a graphical representation of weldment quality versus focal point using two different focal length lenses under an otherwise given set of process parameters;

Figure 3A:
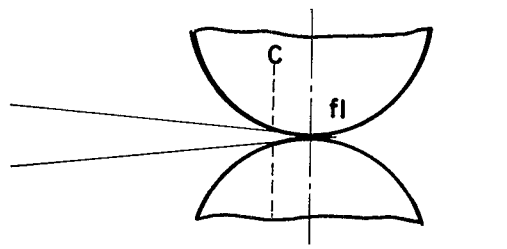
Figure 3B:
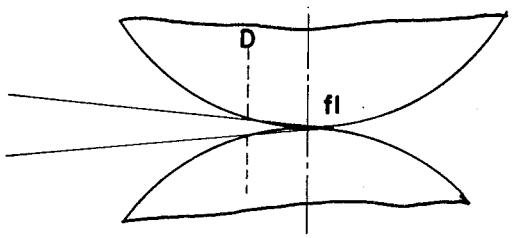
Figure 3C:
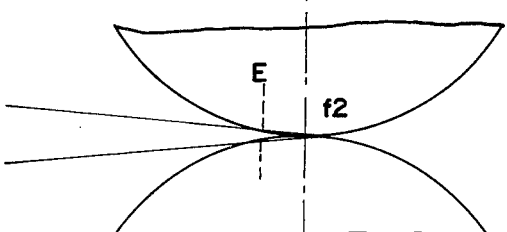
Figure 3D:
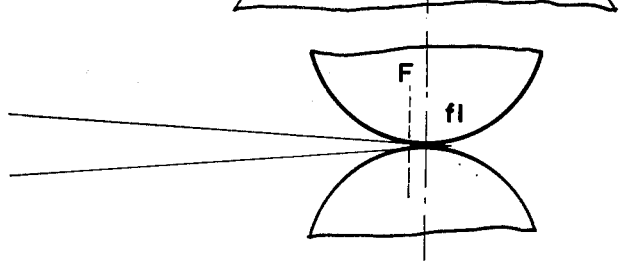
Figure 3E:
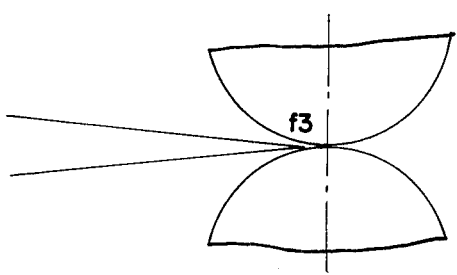
Figure 4B:
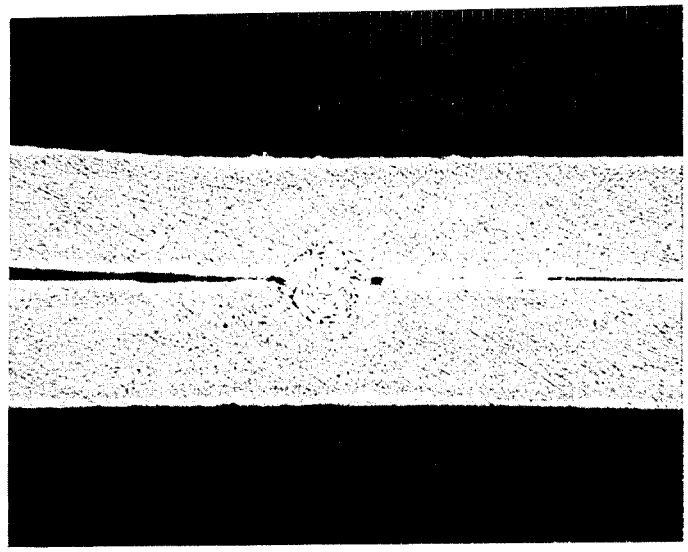
Figure 4A:
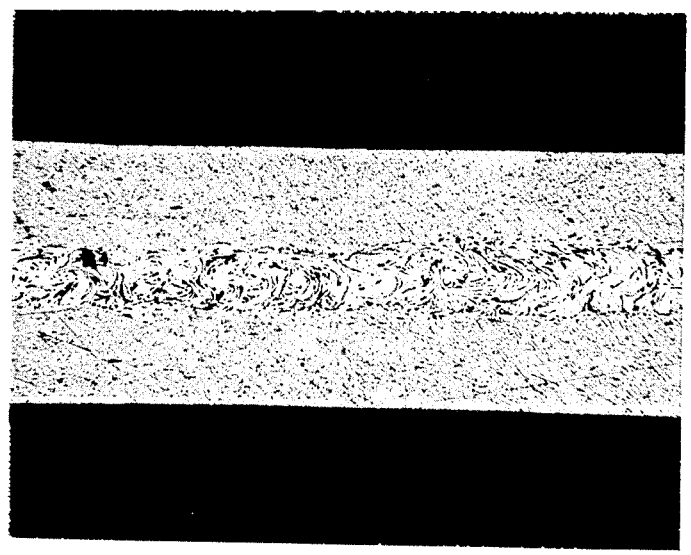

FIGS. 3a–3e are enlarged representational views of the converging Vee formed between the pressure rolls for illustrating the effects of the following parameters upon welding performance: focal point position, focal length and pressure roll diameters; and FIGS. 4(a–b) and 5(a–b) are photo-micrographs at 100× magnification of the welded seam between two strips of aluminum sheet at 400 and 500 feet per minute respectively.

Figure 1:
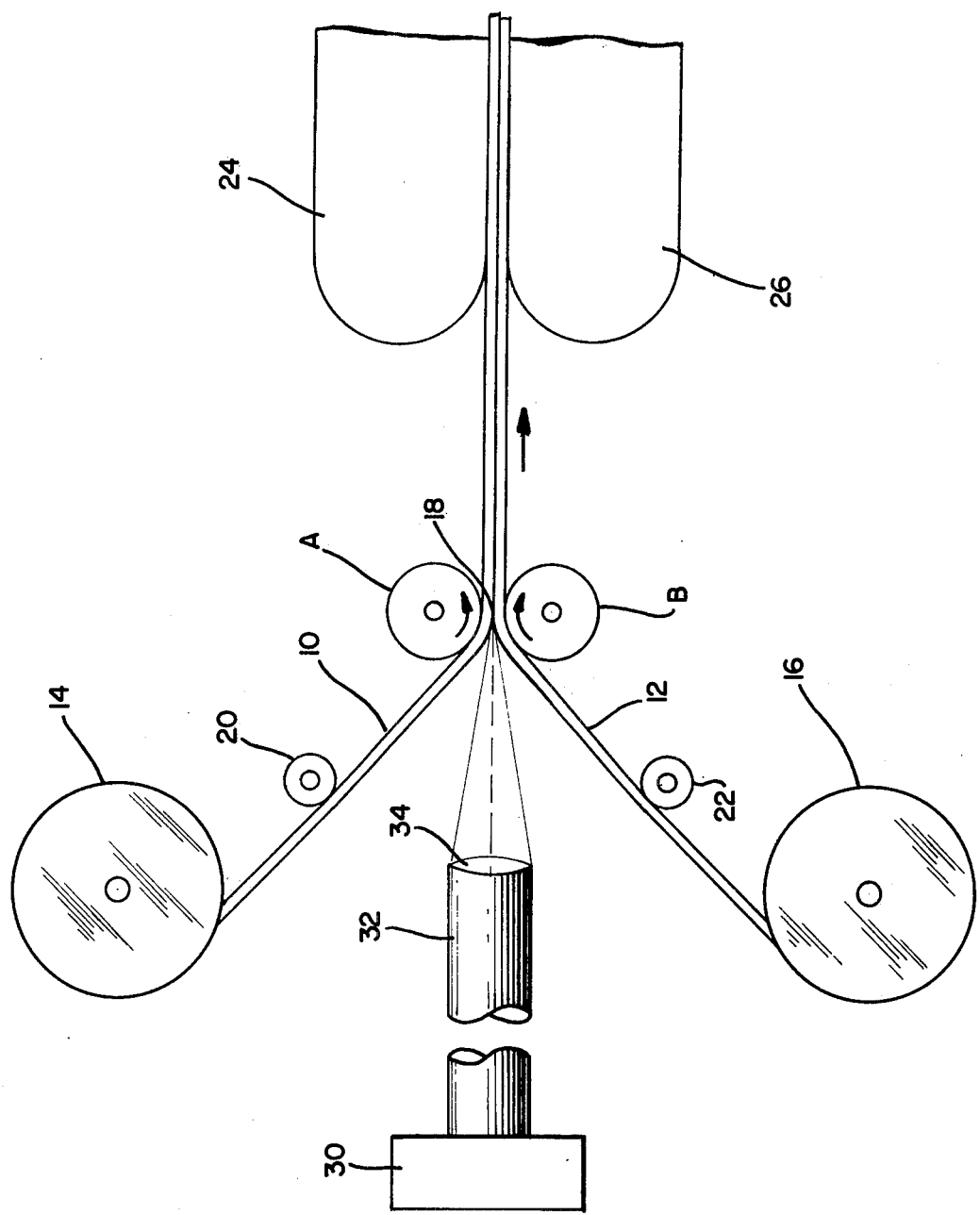
FIG. 1 is a plan view of the preferred apparatus for practicing the process of the present invention.

FIG. 1 illustrates apparatus for carrying out the process of the present invention. Two strips of sheet material 10 and 12 are drawn from storage reels 14 and 16 in a direction toward one another to form a converging Vee geometry with the strips 10 and 12 overlaying one another at the point of convergence 18. The strips 10 and 12 are driven into contact by pressure rolls A and B respectively. For the sake of simplicity, it will be assumed in the following discussion that the pressure rolls A and B are essentially non-compressible and therefore do not deform or flatten out and as a consequence the point of convergence 18 equals or coincides with the point of tangency between the pressure rolls in this instance. By "point of convergence" is meant the point where the converging strips are first brought into intimate contact with one another. By "point of tangency" is meant the unique point where two round incompressible pressure rolls can just be made to touch each other. In the case of compressible pressure rolls, the point of tangency can be defined as the point midway on the line of contact formed by the rolls.

Idler rollers 20 and 22 may be used to assist in manipulating the strips 10 and 12 and for maintaining tension in the strips as they are being drawn. Although each sheet material 10 and 12 is shown in the apparatus of FIG. 1 consisting of a wound strip of continuous length, it is to be understood that the strips of sheet material 10 and 12 are not limited to continuous length strips. Where the strips of sheet material are of predetermined finite length an alternative dispensing arrangement would be necessary to process the strips, preferably consecutively, through the pressure rolls devices A and B respectively. There are known dispensing arrangements which can be employed with conventional equipment to continuously or discontinuously, and at controlled time intervals, feed strip material of finite length in a manner conforming to the process of the present invention.

For practicing the process of the present invention, the strips 10 and 12 may be of any metal although the composition of each shall be substantially compatible. Moreover, the properties of the sheet material, such as its conductivity and thermal diffusivity is not a limitation. Hence, the process is particularly suited to welding conductive metals such as aluminum and copper. Furthermore, the material thickness is limited solely by practical handling and speed considerations. As such, sheet material from very thin gage foil of only 0.001 inch in thickness to sheet thicknesses of up to ¼ inch may be readily welded by the process of the present invention.

The strips 10 and 12 are drawn through the pressure rolls A and B by traction devices 24 and 26 which draw the strips downstream of the point of convergence 18 and along a predetermined and preferably invariant path in the direction shown by the arrows in FIG. 1. Although it is preferable to draw the strips 10 and 12 through the pressure rolls A and B from a point downstream thereof, the strips may be fed from upstream of the pressure rolls or alternatively by driving the pressure rolls themselves. The speed at which the strips are driven through the rolls A and B is a process variable which is influenced in a manner to be discussed at greater length hereinafter.

A conventional source of laser energy 30 generates a laser beam 32 which is optically focused by a lens 34, or other conventional optical medium, into the converging Vee formed between the moving strips 10 and 12 respectively. The power of the laser 32 is not a critical factor in establishing a welded seam between the moving strips; it is, however, one of the controlling variables in determining the maximum travel speed at which a continuous weld can be made. For any laser of given power there is an optimum relationship between focal length, focal point position relative to the point of convergence, beam diameter, beam orientation, pressure roll diameter and welding speed which will produce a weld of acceptable quality. In fact, proper focusing of the laser beam 32 into the converging Vee is essential if one is to obtain a weld at all regardless of laser power. Moreover, by appropriate focusing in accordance with the present invention, optimum utilization of the laser beam energy will be achieved. The focusing of the laser beam will be dicussed at greater length hereinafter in connection with FIGS. 2 and 3.

The pressure rolls A and B perform a critical function in combination with proper focusing of the laser beam for practicing the process of the present invention. It has been determined that the strips 10 and 12 must not only abut each other in intimate relationship at the point of convergence 18 but in addition there must exist at least a nominal compressive force against the strips at such location. A total absence of pressure will result in a total failure to achieve a continuous weld between the moving strips even at substantially reduced speeds with otherwise optimum process variables. The magnitude of the compressive force does not appear significant provided that at least some positive pressure is being applied. Too much pressure is in fact a disadvantage and may cause physical deformation.

It is to be understood that the weld to be formed between the moving strips must exhibit continuity as the strips advance. A lack of continuity in the seam is equivalent for purposes of this disclosure to no weld at all. Weld continuity can be established simply by visual inspection or by pressure testing the seam for the existence of leaks. Obviously the quality of the weld will be dependent upon meeting at least certain minimum pressure requirements which will depend upon the application of the welded strips.

The pressure rolls A and B are preferably conventional squeeze rollers having a circular periphery and a predetermined resiliency. Other means may be employed provided such means assume a curvilinear contour as each approaches the point of convergence. For bilateral weld symmetry, the diameters of the pressure rolls A and B are equal.

FIGS. 2 and 3 indicate both the importance of focusing and the diameter of the pressure rolls A and B to the quality of the weld.

To realize a weld the laser beam must be focused into the converging Vee substantially about the point of convergence. As noted above, the point of convergence may be assumed to coincide with the point of tangency provided that the pressure rolls A and B are essentially noncompressible. However, in actual practice, it is preferred to employ resilient squeeze rolls which will deform or flatten out at or around the point where the rolls make contact with strips 10 and 12. This deformation or flattening out of the rolls causes the point at which the strips 10 and 12 converge to actually shift or position itself away from the point of tangency so that the point of convergence between the strips 10 and 12 is now actually in the upstream direction.

The latitude that may be taken in focusing the laser beam depends primarily upon the focal length, beam diameter, the squeeze roll diameter and upon the speed to be attained. FIGS. 2 and 3a–e are the result of a number of tests that were conducted using a 1 kw $CO_2$ continuous wave 10.6 micron laser, having a 0.5 inch diameter $TEM_{oo}$ mode output beam which was focused through a 2.5 inch and a 3.75 inch focal length optical lens respectively to a focal spot diameter of approximately 0.004 inches at focal points, f1, f2 and f3. A number of additional focal point positions relative to the point of tangency were used to establish the outline for the graphical representation of FIG. 2. Extrapolation from FIGS. 2 and 3 establish the importance of the following criteria for high speed continuous seam welding of over at least 100 feet per minute:

(a) The laser beam should be introduced substantially along the "plane of symmetry" which is hereinafter defined as the plane which passes through the tangent point 18 between pressure rolls A and B and which lies normal to and bisects the shortest line which can be drawn between the centers of the axes of the pressure rolls A and B. When the laser beam is offset from the plane of symmetry but lies in a plane which is parallel to the plane of symmetry a nonsymmetrical weld is formed between the strips. The extent of asymmetry is directly proportional to the offset. However, the position of the beam within the plane of symmetry is adjustable over a wide range of up to at least ±30° provided the focal point is relatively accurately maintained as will be explained hereinafter;

(b) If optimum utilization of the laser beam source is not required and the laser beam is of sufficient power then the focal point may be placed substantially about the point of convergence 18. If, however, optimum utilization is desired then the focal point of the laser should be maintained within a narrow focal point range from essentially the point of convergence to a location downstream thereof. As pointed out above, the expression "optimum utilization" for purposes of the present disclosure means the ability to achieve a continuous weldment at the highest possible speed using the least amount of laser beam energy. The focal position relative to the point of tangency versus pressure is illustrated in FIG. 2 for a 2.5 inch and a 3.75 inch focal length lens respectively with a beam diameter of 0.05 inches. It will be understood that the graph shown in FIG. 2 represents the case where the pressure rolls A and B are noncompressible and hence the point of tangency and the point of convergence are equivalent. When this is not the case, the focal point position cannot be referred to the point of tangency as it is in FIG. 2, but must instead be referred directly to the point of convergence. The focal point range in which an acceptable continuous noninterrupted welded seam is established between the moving strips will vary with variations in the process parameters. For the 1 kw $CO_2$ laser as described heretofore and focused within the plane of symmetry at two aluminum strips moving at a speed of at least 400 feet per minute with 1⅛ inch diameter pressure rolls A and B, the acceptable focal point range is only about 0.070 of an inch wide for the 2.5 inch focal length lens and about 0.130 of an inch wide for the 3.75 inch focal length lens. Interestingly, and quite surprisingly, the focal point range extends from about the point of convergence in the downstream direction only. The focal point range can be widened by reducing the diameter of the pressure rolls A and B and/or the operational speed and/or by either increasing the laser beam power or the focal length or both. However, it is postulated that, for high speed operation, an acceptable weld cannot be established between the strips without focusing the beam to a focal point essentially at the point of convergence or beyond it, i.e., downstream thereof even with a laser beam of substantially higher power;

(c) The passage of a laser beam, which is of a conical geometry, into a converging Vee geometry formed between the advancing strips of material 10 and 12 respectively may cause some clipping of the beam depending on the size of the converging light cone, i.e., focal length, focal point position and pressure roll diameter. For the focal point positions indicated hereinabove, clipping of the laser beam by the pressure rolls was unavoidable. Under certain circumstances clipping may, in fact, be desirable. Once the laser beam strikes the pressure roll, a portion of the laser beam energy will be reflected into the converging Vee and hence into the active weld zone, a portion will be absorbed by the moving strips and appear as heat, and a portion will be scattered diffusely and lost. The farther the clipping occurs from the point of convergence, the greater the fraction of laser beam energy that will be lost.

The relationship between clipping, if any, focal point position, pressure roll diameter and focal length are shown in FIGS. 3a–3e where the diameter of both pressure rolls A and B was varied from a diameter of 1⅛ inches to a diameter of two inches and the optical lens 34 shifted along the optic axis and varied in focal length from 2.5 to 3.75 inches to establish focal point positions f1, f2, and f3 respectively. It should be understood that reference to the diameter of the pressure rolls A and B is intended to embrace the additional thickness provided by the strips 10 and 12. The laser beam diameter in each case was ½ inch. For a focal point position f1 terminating downstream of the point of tangency 18 as is shown in FIGS. 3a and 3b clipping occurred at point C with the 1⅛ inch diameter pressure rolls A and B and a focal length lens of 2.5 inches as shown in FIG. 3a and at point D with the two inch diameter pressure rolls A and B and with the same focal length lens as is shown in FIG. 3b. With a focal point position f2 terminating at the point of tangency 18 as shown in FIG. 3(c) using the same 2.5 inch focal length lens and the two inch diameter pressure rolls A and B clipping occurs at point E. With a 0.5 inch diameter beam and a 3.75 inch focal length lens focused at the focal point position f1, as is shown in FIGS. 3d, using 1⅛ inch diameter pressure rolls A and B, clipping occurred at point F which is closer to the point of tangency than points C, D, and E. This substantiates the fact that the extent of beam clipping can be reduced by increasing the focal length. Empirical evaluation of the welds from FIGS. 3 (a–d) substantiates that for a 2.5 inch focal length lens a better quality weld is achieved using the smaller diameter pressure rolls and for the 3.5 inch focal length lens a superior weld was obtained over a broader range using the smaller diameter pressure rolls. Hence, under otherwise given conditions smaller diameter pressure rolls with result in greater energy efficiency. If clipping is maintained sufficiently close to the point of convergence, the Vee geometry will effectively channel the laser beam energy into the weld zone. The third focal point position f3 as is shown in FIG. 3(e) was established with a 0.5 inch diameter beam, a 2.5 inch focal length lens and 1⅛ inch diameter pressure rolls A and B, and terminates at a location just preceding the point of tangency 18, i.e., slightly upstream of the point of tangency. Here, notwithstanding the fact that no clipping occurs nor the closeness of the focal point to the point of tangency 18, a continuous weld could not be achieved. Accordingly, the power of the laser beam is not nearly as important in achieving a continuous weld as the location of the focal point, the size of the converging light cone as determined by the focal length and beam diameter, and the pressure roll diameter as explained hereinabove in paragraphs (a), (b) and (c) respectively, when optimum utilization of the laser beam source is required. Further, the properties of the converging Vee geometry permit more effective absorption of the laser beam energy resulting in higher welding speeds, and act to inhibit balling of the welded material. The latter is a problem commonly associated with edge weldment techniques on thin section material.

The above discussion assumes of course that the pressure rolls A and B are non-resilient. If the rolls are resilient, the focal point can be moved upstream of the point of tangency which will reduce the clipping, but the focal point can still be maintained at or downstream of the point of convergence. It will be seen that this helps to maintain clipping sufficiently close to the point of convergence much in the same way as increasing focal length or reducing roll diameter. Too much clipping is undesirable because it results in useless preheat of a large amount of material which will never be melted or fused.

Photomicrographs of the weldment produced by the process of the present invention using the 1 kw $CO_2$ laser as defined heretofore and under conditions which fulfill the criteria discussed hereinabove are shown in FIGS. 4(a-b) and 5(a-b) for sheet aluminum strips of 0.006 inches in thickness with FIGS. 4(a-b) showing the weldment obtained at a welding speed of 400 feet per minute and FIG. 5(a-b) showing the weldment obtained at a welding speed of 500 feet per minute respectively. The photomicrographs were taken using a conventional optical microscope at 100× magnification. The weldment in each case has a micro-structure which is characteristic of all fusion welds but shows no evidence of a Heat Affected Zone (HAZ) at such magnification. A Heat Affected Zone, as stated earlier, is normally visible to the naked eye. Both FIGS. 4 and 5 show the weldment lengthwise, to illustrate the continuity of the weld along the length of the seam, as well as in cross-section. The weld obtained at 400 feet per minute is more circular in cross-section than that obtained at 500 feet per minute as is evident from a comparison of FIG. 4b with FIG. 5b. Both weldments are symmetrical and have a thickness of only a fraction of the strip thickness. In fact, the thickness of the weldment is essentially independent of the strip thickness.

The examples referred to above relate to strip material of aluminum. Other strip material compositions were tested which substantiate the applicability of the process to carbon steel, stainless steel, copper brass and dissimilar materials represented by combinations of the metals herein specified; all of which resulted in equally successfully continuous welds. Accordingly, the invention as disclosed and claimed herein should not be construed as limited to any specific strip material composition. In addition, the weldment produced for each case except stainless and carbon steel was characterized by the absence of a Heat Affected Zone (HAZ).

It is to be understood that many variations are possible in practicing the present invention. For example, although FIG. 1 describes the preferred system with the laser beam directed substantially within the plane of symmetry and having its major vector component in the direction of travel, an alternate embodiment would be to position the strips to form a Vee configuration and then to move the strips relative to the laser beam such that vectorially the major component of the beam is perpendicular to the direction of travel.

What is claimed is:

1. A method for continuous seam welding of flexible strips of metallic sheet material having reflective surfaces while the strips are moving, comprising the steps of:
    (a) directing the moving strips toward one another to form a converging Vee between the moving strips with the reflective surfaces facing one another;
    (b) applying a force of above zero pounds at a location contiguous to the point at which the moving strips converge such that the moving strips overlay one another in intimate contact at the point of convergence;
    (c) generating a laser beam of energy;
    (d) providing an optical medium for focusing said laser beam;
    (e) focusing said laser beam with said optical medium to produce a converging beam of laser energy; and
    (f) directing said converging beam of laser energy into said converging Vee with the focal point located substantially about said point of convergence, the geometry of said converging Vee being such that portions of said converging beam of laser energy that are incident upon the reflective surfaces of said moving strips at a location ahead of said point of convergence are reflected at least in part by the surfaces of said moving strips in a direction toward said point of convergence so that a continuous welded seam is established between the overlaid strips.

2. A method as defined in claim 1 wherein the moving strips are passed between two pressure rollers with the rollers arranged such that the strips form a converging Vee.

3. A method as defined in claim 2 wherein the point of convergence of the moving strips substantially equals the point of tangency between said rollers.

4. A method as defined in claim 3 wherein said laser beam is focused substantially within the plane of symmetry passing through the point of tangency between said pressure rollers.

5. A method as defined in claim 2 wherein the strips are aluminum.

6. A method as defined in claim 2 wherein the strips are stainless steel.

7. A method as defined in claim 2 wherein the strips are copper.

8. A method as defined in claim 2 wherein the strips are brass.

9. A method as defined in claim 2 wherein the strips are of carbon steel.

10. A method as defined in claim 2 wherein the strips are of dissimilar metal selected from the group consisting of: aluminum, copper, brass, carbon steel and stainless steel.

11. A method as defined in claim 1 wherein the power of said laser beam is about one kilowatt.

12. A method as defined in claim 4 wherein said laser beam lies substantially within the plane of symmetry between the moving strips with its major component in the direction of travel.

13. A method as defined in claim 4 wherein said laser beam lies substantially within the plane of symmetry between the moving strips with its major component perpendicular to the direction of travel.

14. A method as defined in claim 1 wherein the moving strips travel at a speed of at least about 100 feet per minute.

15. A method of fusion welding at least two thin flexible strips of sheet material composed of a highly conductive metal selected from the group consisting of aluminum, copper and brass, having a thickness in the range of from about 0.001 to about ¼ inch and having reflective surfaces, while the strips are moving at a relatively high rate of speed of at least about 100 feet per minute, comprising the steps of:
  (a) directing the moving strips toward one another to form a converging Vee between the moving strips with the reflective surfaces facing one another;
  (b) providing a pair of pressure rollers;
  (c) passing the moving strips between the pair of pressure rollers;
  (d) applying a force of above zero pounds against the moving strips with the pair of pressure rollers at a location contiguous to the point at which the moving strips converge such that the moving strips overlay one another in intimate contact at the point of convergence;
  (e) generating a low power laser beam of energy;
  (f) providing an optical medium for focusing said laser beam;
  (g) focusing said laser beam with said optical medium to produce a converging beam of laser energy; and
  (h) directing said converging beam of laser energy into said converging Vee with the focal point located substantially about said point of convergence, the geometry of said converging Vee being such that portions of said converging beam of laser energy that are incident upon the reflective surfaces of said moving strips at a location ahead of said point of convergence are reflected at least in part by the surfaces of said moving strips in a direction toward said point of convergence so that a fusion weld is established between the overlaid strips.

16. A method as defined in claim 15 wherein said laser beam is focused substantially within the plane of symmetry passing through the point of tangency between said pressure rollers.

17. A method as defined in claim 15 wherein the power of said laser beam is about one kilowatt.

18. A method for continuous seam welding of flexible strips of metallic sheet material having reflective surfaces while the strips are moving, comprising the steps of:
  (a) directing the moving strips toward one another to form a converging Vee between the moving strips with the reflective surfaces facing one another;
  (b) providing a pair of pressure rollers of substantially equal diameter;
  (c) passing the moving strips between the pair of pressure rollers;
  (d) applying a force of above zero pounds against the moving strips with the pair of pressure rollers at a location contiguous to the point at which the moving strips converge such that the moving strips overlay one another in intimate contact at the point of convergence;
  (e) maintaining the speed of the moving strips at least at about 100 feet per minute;
  (f) generating a laser beam of energy;
  (g) providing an optical medium for focusing said laser beam;
  (h) focusing said laser beam with said optical medium to produce a converging beam of laser energy; and
  (i) directing said converging beam of laser energy into said converging Vee substantially along the plane of symmetry passing through the point of tangency between said pressure rollers while maintaining the focal point of said converging beam of laser energy at a location substantially about said point of convergence, the geometry of said converging Vee being such that portions of said converging beam of laser energy that are incident upon the reflective surfaces of the moving strips at a location ahead of said point of convergence are reflected by the surfaces on the moving strips in a direction toward said point of convergence so that a continuous welded seam is established between the overlaid strips.

* * * * *